3,270,012
METHOD FOR PREPARING CEPHALOSPORIN
C_A ANTIBIOTICS
Harvey M. Higgins, Jr., Danville, Ind., assignor to Eli Lilly and Company, Indianapolis, Ind., a corporation of Indiana
No Drawing. Filed Mar. 5, 1965, Ser. No. 437,552
3 Claims. (Cl. 260—243)

The present invention relates to the preparation of 7-acylamido - 3 - pyridinomethyl - 3 - cephem-4-carboxylic acids, a class of potent antibiotics having the basic ring structure of cephalosporin C.

The subject compounds are described and methods for their preparation are disclosed in co-pending application No. 398,028 of Edwin H. Flynn, filed September 21, 1964. One method of preparation involves commingling an appropriate 7-acylamidocephalosporanic acid in an aqueous medium with an excess of a pyridine at pH 6–7 and allowing the mixture to react at about 50–75° C. for about 4–8 hours. The desired product can be isolated from the reaction product mixture by evaporation to dryness under vacuum, triturating the residue with acetone to remove starting materials, and repeatedly precipitating the washed residue from aqueous solution by addition of acetone. In many cases, the desired product can be crystallized directly from aqueous solution by dissolving the washed residue in water at elevated temperature and then cooling.

An alternative method of preparation, referred to in the same application, adds a water-soluble thiocyanate salt to the reaction mixture to accelerate the reaction and to stabilize the reactants and products. It is to this method that the present application relates.

An object of this invention is to provide an improved method for the production of cephalosporin $C_A$ compounds, which method is free from disadvantages of previously described processes.

In the novel method of synthesis of the present invention, the reaction is accelerated, the reactants and products are stabilized, and a better yield of the desired product is obtained, by incorporating thiocyanate or iodide ions in the reaction mixture, suitably in the form of a water-soluble thiocyanate or iodide salt, for example, potassium thiocyanate, pyridine thiocyanate, triethylamine thiocyanate, sodium thiocyanate, lithium thiocyanate, strontium thiocyanate, ammonium thiocyanate, potassium iodide, sodium iodide, ammonium iodide, lithium iodide, strontium iodide, pyridinium iodide, or the like. The said ions are desirably added in at least about equimolar ratio to the starting cephalosporin compound, and preferably in a molar ratio of 2:1 to 10:1 or more. Larger quantities are not detrimental to the reaction or products, but tend eventually to complicate the recovery process.

In one embodiment of the invention, a mixture of potassium thiocyanate, pyridine, and 7-α-thienylacetamidocephalosporanic acid sodium salt is allowed to react in aqueous solution at around pH 3–8.5, preferably pH 6–7, at an elevated temperature of from about 40 to about 100° C., preferably around 50–75° C., the pH being conveniently adjusted with 85 percent orthophosphoric acid. Under the preferred conditions, a reaction time of about 4–8 hours is sufficient. Lower temperatures require longer times, while higher temperatures tend to cause product degradation. The cephalosporin starting material should be used in the form of a water-soluble salt, for example, the sodium, potassium, ammonium, or the like salt. The pyridine should be used in at least equimolar ratio to the cephalosporin compound and preferably in an excess of 10–100 percent or more (e.g., around 30 percent excess) in order to effect maximum conversion of the more expensive cephalosporin compound. The excess pyridine can be readily recovered for reuse. Under the conditions of the reaction, the acetoxy group of the cephalosporin molecule is split off and replaced by pyridine, the attachment of the latter moiety to the residual methylene group being directly to the nitrogen atom, forming a quaternary ammonium derivative, which in turn forms an inner salt with the carboxyl in the 4 position.

The reaction product mixture is conveniently worked up by diluting it with several volumes of water and washing the aqueous reaction product mixture with an inert, water-immiscible organic solvent such as chloroform to remove unreacted pyridine. Traces of chloroform are conveniently removed from the washed aqueous reaction product mixture by distillation in vacuo. The aqueous mixture is stirred and chilled to about 0° C. and acidified with dilute aqueous acid, causing 7-α-thienylacetamido-3-pyridinomethyl-3-cephem-4-carboxylic acid hydrothiocyanate to precipitate, thus separating the cephalosporin $C_A$ values from the excess of thiocyanate, unreacted starting materials, by-products, and other impurities.

The desired 7-α-thienylacetamido - 3 - pyridinomethyl-cephem-4-carboxylic acid is conveniently obtained by dissolving the intermediate hydrothiocyanate salt in a mixture of water and a water-miscible organic solvent such as acetonitrile, dimethylacetamide, or the like, and adjusting the solution to about pH 6 with a base such as sodium hydroxide, potassium hydroxide, or, preferably, an organic base such as triethylamine, dimethylaniline, pyridine, or the like, which is soluble in the organic solvent used. Other suitable solvents include mixtures of methanol with acetonitrile or dimethylacetamide. The solution thus obtained is diluted with several volumes of an organic solvent such as methanol and the desired product crystallizes as the inner salt from the homogeneous solution.

In another embodiment of the invention, potassium iodide, pyridine, and 7-α-thienylacetamidocephalosporanic acid sodium salt are allowed to react in aqueous solution at pH 6–7 at a temperature around 50–75° C. for about 4–8 hours.

In this embodiment, the reaction product mixture is worked up in the manner described supra, and the cephalosporin $C_A$ values are separated as 7-α-thienyl-3-pyridinomethyl-3-cephem-4-carboxylic acid hydriodide from the excess potassium iodide, unreacted starting materials, by-products, and impurities.

The 7-α-thienylacetamido-3-pyridinomethyl-3-cephem-4-carboxylic acid is conveniently obtained from the intermediate hydriodide salt by the same method as applied to the hydrothiocyanate salt and described hereinabove.

The hydrothiocyanate and hydriodide salts, together with another method of recovering therefrom the cephalosporin $C_A$ values, are the subject of the co-pending application of Jackson, Spencer, and Higgins, filed of even date.

The compounds produced by the present invention, the 7 - acylamido - 3 - pyridinomethyl - 3 - cephem - 4 - carboxylic acids, are conveniently represented by the following formula:

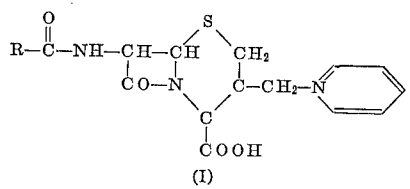

(I)

where

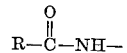

is acylamido, R being an organic radical.

The art now recognizes a wide range of acylamido groups, R—CO—NH—, at the 7 position of the cephalosporanic acid molecule, and this part of the molecule is not directly concerned with the process of the present invention, which relates to the preparation of the so-called cephalosporin $C_A$ compounds, having a pyridinomethyl substituent in the 3 position rather than the acetoxymethyl substituent of the cephalosporin C compounds. Illustratively, however, the new process affords cephalosporin $C_A$ compounds wherein R has the structure:

$$R^1—(CH_2)_n—$$

where $R^1$ is hydrogen, $C_1-C_7$ alkyl, $C_1-C_7$ alkoxy, $C_1-C_7$ alkylmercapto, phenyl, phenoxy, phenylmercapto, thienyl, furyl, benzothienyl, or benzofuryl, and $n$ is 0 or 1.

Additionally, the art also recognizes a wide range of cephalosporin $C_A$ compounds bearing a pyridinomethyl substituent at the 3 position, the pyridino ring being either unsubstituted or bearing one or more of a variety of substituents. Such substituents on the pyridine ring have no bearing upon the process of the present invention, and may thus vary widely in nature. A preferred group of compounds, from the pharmaceutical standpoint, includes unsubstituted pyridino and pyridino having, at the 3 or 4 position, a substituent selected from the group consisting of methyl, ethyl, hydroxy, hydroxymethyl, trifluoromethyl, halo, cyano, carboxy, carbo($C_1-C_4$)alkoxy, ($C_1-C_4$)alkanoyl, ($C_1-C_4$)alkanoyloxy, and

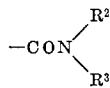

$R^2$ being hydrogen, methyl, ethyl, or cyclopropyl, and $R^3$ being hydrogen, methyl, or ethyl.

The radicals referred to above are illustrated as follows:

$C_1-C_7$ alkyl refers broadly to primary, secondary, and tertiary alkyl, of both straight-chain and branched-chain configuration, including methyl, ethyl, n-propyl, isopropyl, n-butyl, sec.-butyl, tert.-butyl, n-amyl, isoamyl, 2-amyl, 3-amyl, neopentyl, n-hexyl, n-heptyl, isoheptyl, 3-heptyl, 2-methylhexyl, and the like.

$C_1-C_7$ alkoxy refers to $C_1-C_7$ alkyl-o— groups wherein alkyl is as defined above.

$C_1-C_7$ alkylmercapto refers to $C_1-C_7$ alkyl-S— groups wherein alkyl is as defined above.

Thienyl, benzothienyl, furyl, and benzofuryl groups may be attached at either the $\alpha$ or $\beta$ position.

Carbalkoxy refers to carbomethoxy, carbethoxy, carbopropoxy, carbo-n-butoxy, carbo-sec.-butoxy, carbo-tert.-butoxy and the like.

Alkanoyl refers to acetyl, propionyl, butyryl, isobutyryl, and the like.

Alkanoyloxy refers to acetoxy, propionoxy, n-butyroxy, isobutyroxy, and the like.

The carbamyl group,

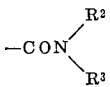

may be unsubstituted, mono-substituted, or di-substituted, as defined, and in the di-substituted embodiments, the substituents may be the same or different. Thus, illustratively, the carbamyl group may be

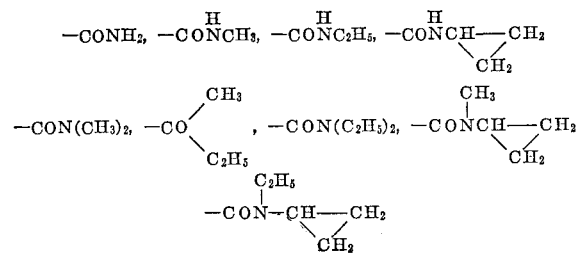

and the like.

The compounds produced by the present invention are antibiotic substances which are highly effective against such organisms as penicillin-resistant *Staphylococcus aureus,* the hemolytic streptococci, and a variety of Gram-negative pathogens such as *Shigella sonnei, Klebsiella pneumonia Aerobacter aerogenes,* and the like.

The invention is further illustrated by the following operating examples.

*Example 1*

A solution of 200 g. of sodium 7-α-thienylacetamidocephalosporanate, 908 g. of potassium thiocyanate, and 50 ml. of pyridine in 200 ml. of water was adjusted to pH 6.5 with 10 ml. of 85 percent syrupy phosphoric acid, and heated at 60° C. for 5 hours with stirring.

The reaction product mixture was cooled and diluted to 4 liters with distilled water. It was washed 5 times with 200-ml. portions of chloroform and the chloroform wash liquid discarded. The aqueous solution was concentrated somewhat in vacuo to remove traces of chloroform. The aqueous solution was stirred and chilled to about 0° C. and acidified to pH 2 by adding 6 N aqueous hydrochloric acid dropwise. The mixture was kept at about 0° C. for an additional 3 hours, then filtered on a sintered glass funnel, and the crystalline material washed well with water and dried in vacuo at 40° C. for about 15 hours. The product thus obtained weighed 163 g. (75 percent of theory) and was identified as 7-α-thienylacetamido - 3 - pyridinomethyl - 3-cephem-4-carboxylic acid hydrothiocyanate.

*Analysis.*—Calcd.: C, 50.61; H, 3.82; N, 11.81; S, 20.27; $SCN^\ominus$, 12.3. Found: C, 50.87; H, 4.10; N, 11.42; S, 19.82; $SCN^\ominus$, 12.9.

The hydrothiocyanate salt had infared absorption and nuclear magnetic resonance spectra consistent with the expected structure. It had an apparent molecular weight of 488 by titration in 2:1 dimethylformamide-water and a $pK'_a$ of 3.4. Its ultra-violet absorption spectrum determined in water had maxima at 236 and 255 mμ with molecular extinction coefficients of 15,900 and 14,300, respectively.

Twenty grams of 7-α-thienylacetamido-3-pyridinomethyl-3-cephem-4-carboxylic acid hydrothiocyanate salt were added in portions to 10 ml. of a 50:50 mixture of water and acetonitrile with stirring. Solution was complete almost immediately, at which time sufficient triethylamine was added to adjust the mixture to about pH 6 and the somewhat viscous mixture was filtered to remove any solid impurities. To the filtrate which had a volume of about 25 ml., were added about six volumes of methanol. The crystalline product obtained thereby was filtered off and dried. It weighed 14.7 g. (86 percent of theory) and was identified as 7 - α - thienylacetamido - 3 - pyridinomethyl-3-cephem-4-carboxylic acid.

*Example 2*

A solution of 200 g. of sodium 7-α-thienylacetamidocephalosporanate, 300 g. of potassium iodide, 50 ml. of pyridine, and 5 ml. of 85 percent phosphoric acid in 200 ml. of water was heated at 60° C. for 5 hours with stirring.

The reaction product mixture was cooled and diluted to 2,000 ml. with distilled water. It was washed three times with 200-ml. portions of chloroform and the chloroform wash liquid discarded. The aqueous solution was concentrated somewhat in vacuo to remove traces of chloroform and then stirred and chilled to about 0° C. and acidified to pH 2 with 3 N aqueous hydrochloric acid added dropwise. The aqueous acidic mixture was kept at about 0° C. for about 2 hours and filtered. The solid thus obtained was washed with cold water and dried in vacuo at about 40° C. The product weighed 168 g. (65 percent of theory) and was identified as 7-α-thienylacetamido - 3 - pyridinomethyl - 3 - cephem - 4 - carboxylic acid hydriodide.

*Analysis.*—Calcd.: C, 41.99; H, 3.34; N, 7.73; S, 11.80; I, 23.36. Found: C, 41.87; H, 3.98; N, 7.46; S, 11.62; I, 23.63.

The hydriodide salt had infrared and nuclear magnetic resonance spectra consistent with the expected structure. It had an apparent molecular weight of 540 by titration and a $pK'_a$ of 3.2. Its ultraviolet absorption spectrum had maxima at 237 and 255 mµ with molecular extinction coefficients of 24,350 and 13,850, respectively.

Two grams of 7-α-thienylacetamido-3-pyridinomethyl-3-cephem-4-carboxylic acid hydriodide were dissolved in a mixture of 10 ml. of dimethylacetamide and 10 ml. of methanol. The mixture was stirred for about 15 minutes, 1 ml. of triethylamine was added, and stirring was continued for a short time. Seed crystals of 7-α-thienylacetamido-3-pyridinomethyl-3-cephem-4-carboxylic acid were added to the mixture and the mixture was cooled and stirred in an ice bath for about an hour, during which time the product gradually crystallized. The crystalline product obtained thereby was filtered off and washed with two 10-ml. portions of a 50:50 mixture of dimethylacetamide and methanol and with 10 ml. of methanol, then vacuum dried. The product weighed 550 mg. and was identified as 7-α-thienylacetamido-3-pyridinomethyl-3-cephem-4-carboxylic acid.

I claim:

1. In a method for preparing a 7-acylamido-3-pyridino-methyl-3-cephem-4-carboxylic acid, which method comprises reacting a 7-α-acylamidocephalosporanic acid with a pyridine in an aqueous medium, the improvement which comprises carrying out said reaction in the presence of an at least equimolar proportion, based on said 7-acylamidocephalosporanic acid, of ions of the class consisting of thiocyanate and iodide.

2. The improved method of claim 1 wherein said ions are present in the form of potassium thiocyanate.

3. The improved method of claim 1 wherein said ions are present in the form of potassium iodide.

No references cited.

HENRY R. JILES, *Primary Examiner.*

J. W. ADAMS, *Assistant Examiner.*